Jan. 15, 1957  D. F. HUTCHISON  2,777,240
REEL CLAMPS FOR FISHING RODS
Filed July 26, 1954

INVENTOR.
Donald F. Hutchison
BY
ATTORNEY

United States Patent Office 2,777,240
Patented Jan. 15, 1957

2,777,240

REEL CLAMPS FOR FISHING RODS

Donald F. Hutchison, Denver, Colo., assignor to Wright & McGill Co., Denver, Colo.

Application July 26, 1954, Serial No. 445,511

1 Claim. (Cl. 43—22)

This invention relates to means for attaching a fishing reel to a fishing pole and has for its principal object the provision of an attachment device which will automatically accommodate reels of various types and sizes and which will enable the reels to be quickly and easily removed, replaced and interchanged without the use of tools or other equipment.

Another object of the invention is to provide a quick acting reel attachment device which can be operated by one finger and which will tightly secure the reel in place upon the rod without danger of loss.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

Figure 1:
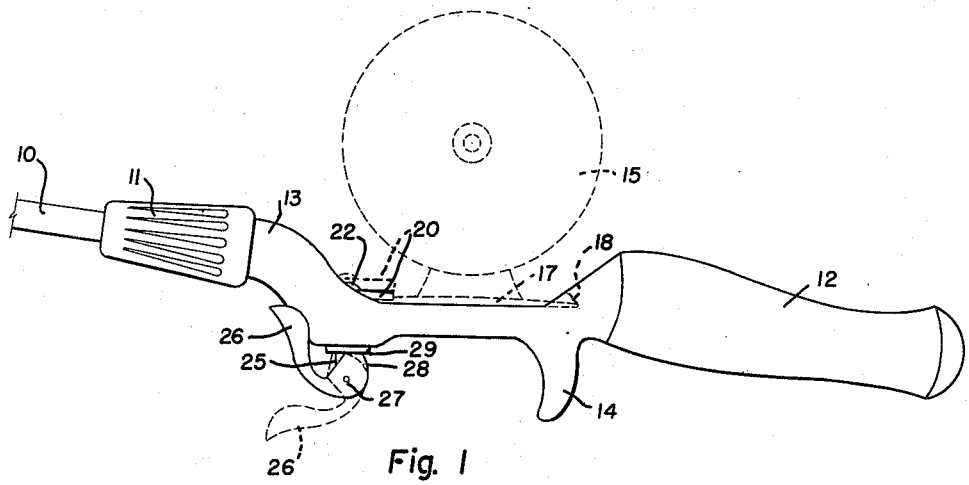
Fig. 1 is a side view of the handle portion of a conventional fishing rod illustrating the invention in place thereon.
Figure 2:
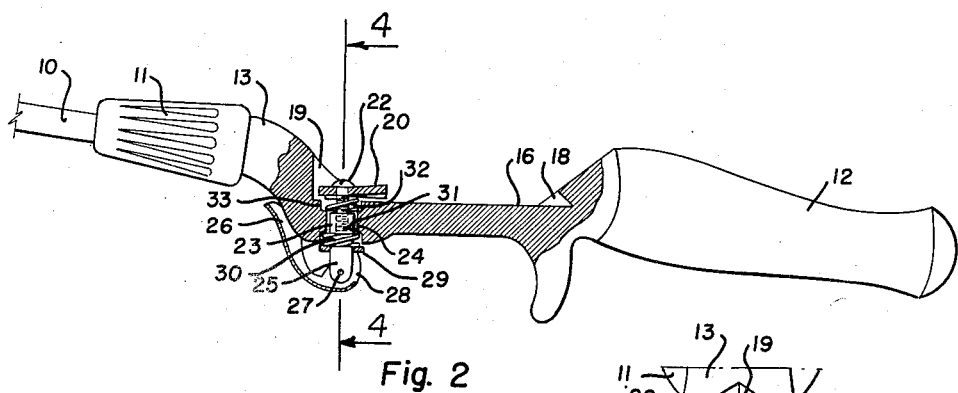
Fig. 2 is a similar view, partially in longitudinal section, illustrating the construction of the improved reel attachment device.
Figure 3:
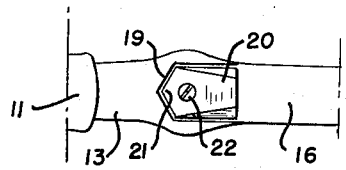
Fig. 3 is a plan view of the forward portion of a reel seat portion of the rod of Fig. 1.
Figure 4:
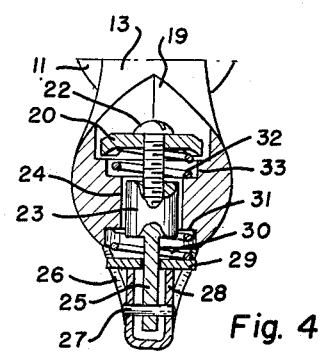
Fig. 4 is an enlarged cross-section, taken on the line 4—4, Fig. 2.

In the drawing, a conventional fishing rod is indicated at 10 with its handle attachment ferrule at 11, handle at 12, reel seat portion at 13 and finger grip at 14. A conventional reel is indicated in broken line at 15 with its foot at 17.

The invention relates more particularly to the reel seat portion 13. The reel seat portion 13 provides an elongated flat reel seat 16 upon which the foot 17 of the reel rests. A foot-receiving notch 18 is formed in the reel seat portion 13 at the handle extremity of the reel seat 16 to receive the rear extremity of the foot 17.

The forward extremity of the foot 17 is clamped in a receiving recess 19 formed at the forward or pole extremity of the seat 16 by means of a clamping plate 20. The forward portion of the recess 19 is pointed and the forward extremity of the clamping plate 20 is similarly pointed, as indicated at 21, to fit the contour of the recess 19 and prevent rotation of the plate 20.

The clamping plate 20 is held in place by means of an adjusting screw 22 which passes downwardly therethrough and is threaded into a cylindrical plug 23 positioned in a vertical passage 24 in the reel seat portion 13. A hinge tongue 25 is formed on the lower extremity of the plug 23 and extends downwardly therefrom and a lever 26 is mounted on a hinge pin 27 extending through the tongue 25. The hinged extremity of the lever 26 is U-shaped to form two cam-shaped sides 28, there being one cam-shaped side on each side of the tongue 25. These sides are eccentrically mounted on the pin 27 and act to force a spring washer 29 upwardly against a lower compression spring 30 which rests against a shoulder 31 in the lower extremity of the passage 24. A second upper compression spring 32 rests in a counterbore 33 at the top of the passage 24 and acts to constantly urge the clamping plate 20 upwardly. Thus, the plug 23 resiliently floats between the two springs 30 and 32.

Let us assume that it is desired to apply the reel 15 to the reel seat portion 13. The cam lever 26 is swung downwardly to the broken line position of Fig. 1. This allows the lesser radius portions of the cam-shaped sides 28 to swing upwardly so that the upper spring 32 can lift the clamping plate 20 upwardly to the freely floating broken line position of Fig. 1. The rear extremity of the reel foot 17 is now slipped into the foot-receiving notch 18. The plate 20 can now be manually lifted to allow the forward extremity of the foot 17 to be passed over one side of the recess 19 and beneath the clamping plate 20 therein. The lever 26 is now forced forwardly with the fore-finger so that the greater radius portions of the cam-shaped sides 28 will react against the washer 29 to pull the clamping plate 20 downwardly against the forward extremity of the foot 17 to securely clamp the latter extremity in position between the sides of the recess 19 to firmly lock the reel in place on the reel seat 16.

To change reels, it is only necessary to snap the lever 26 downwardly with the fore-finger to allow the clamping plate 20 to float freely so that it can be lifted, against the action of the spring 30, to allow the forward extremity of the reel foot 17 to be swung sidewardly from the recess 19. It will be noted that the lever 26 is curved both longitudinally and laterally so as to conform to and fit about the reel seat portion 13 so as to avoid bothersome projections which could catch upon the clothing or surrounding brush. It is also desired to call attention to the fact that the rearward extremity of the clamping plate 20 is transversally and upwardly arched to provide a recess for securely maintaining the reel foot in longitudinal alignment with the elongated reel seat 16.

While a specific form of the improvement has been described and illustrated herein, it is desired to be understood that the same may be varied within the scope of the appended claim, without departing from the spirit of the invention.

Having thus described the invention what is claimed and desired secured by Letters Patent is:

Means for securing the foot of a fishing reel to a fishing rod comprising: a reel seat portion to which said rod is secured; an elongated, flat reel seat formed in said portion and adapted to receive the foot of the fishing reel, said portion having a rear foot notch formed therein at the rear of said reel seat for receiving the rear foot of said reel; said reel seat having a V-shaped guide recess depressed downwardly therein at the forward extremity thereof; a clamping plate positioned over the forward extremity of said reel seat and provided with a pointed forward extremity extending into said guide recess and adapted to move vertically in the latter, wall portions of said recess acting to prevent lateral movement of said pointed extremity, there being a vertical passage through said reel seat portion below said clamping plate; there being an upper counterbore in said passage; an upper compression spring seated in said upper counterbore; there being a lower counterbore in said passage; a lower compression spring seated in said lower counterbore; a cylindrical plug positioned in said passage intermediate said counterbores and being vertically movable in said passage; an adjusting screw extending downwardly through said clamping plate into said plug to support the latter on said upper spring; a hinge tongue formed on the lower extremity of said plug and extending downwardly therefrom; a cam lever pivotally mounted on said hinge tongue; and a spring washer positioned between said cam lever and said lower compression spring and acting to maintain the latter in said lower counterbore, so that actuation of said cam lever will simultaneously compress said lower spring upwardly and said upper spring downwardly to resiliently clamp said clamping plate against the forward foot of said reel.

References Cited in the file of this patent

UNITED STATES PATENTS

| | | |
|---|---|---|
| 399,435 | Phillips | Mar. 12, 1889 |
| 1,497,213 | Jurczyk | June 10, 1924 |
| 1,812,452 | Shaw | June 30, 1931 |
| 1,909,529 | Gephart | May 16, 1933 |
| 1,923,035 | Hoele et al. | Aug. 15, 1933 |
| 1,965,796 | Dunkelberger | July 10, 1934 |
| 2,456,681 | Culver | Dec. 21, 1948 |
| 2,485,144 | Espenship | Oct. 18, 1949 |